(12) United States Patent
Bloehbaum

(10) Patent No.: US 7,087,879 B2
(45) Date of Patent: Aug. 8, 2006

(54) SIGNAL PROCESSING METHOD AND AN EVALUATION CIRCUIT

(75) Inventor: Frank Bloehbaum, Freiburg (DE)

(73) Assignee: Sick AG, Waldkirch (DE)

(*) Notice: Subject to any disclaimer, the term of this patent is extended or adjusted under 35 U.S.C. 154(b) by 163 days.

(21) Appl. No.: 10/389,232

(22) Filed: Mar. 13, 2003

(65) Prior Publication Data
US 2003/0222207 A1 Dec. 4, 2003

(30) Foreign Application Priority Data
Mar. 14, 2002 (DE) .................... 102 11 343

(51) Int. Cl.
*H01J 40/14* (2006.01)
(52) U.S. Cl. .......... 250/214 R; 250/214 DC; 327/514
(58) Field of Classification Search ......... 250/214 R, 250/214 A, 214 LA, 214 DC, 214 RC, 221, 250/222.1; 327/514, 515; 340/555, 556, 340/557
See application file for complete search history.

(56) References Cited

U.S. PATENT DOCUMENTS

| | | | | | |
|---|---|---|---|---|---|
| 4,982,082 A | * | 1/1991 | Ottusch | ............ | 250/214 R |
| 5,155,353 A | * | 10/1992 | Pahr | ............ | 250/214 R |
| 5,444,239 A | | 8/1995 | Nacman et al. | | |
| 5,883,383 A | | 3/1999 | Dragne | | |
| 6,018,159 A | | 1/2000 | Alderman et al. | | |
| 6,800,859 B1 | * | 10/2004 | Yoshida et al. | ............ | 250/372 |

FOREIGN PATENT DOCUMENTS

| | | |
|---|---|---|
| DE | 03803033 A1 | 8/1989 |
| DE | 04228299 A1 | 3/1994 |
| DE | 19510304 C1 | 2/1996 |
| DE | 19908215 A1 | 9/2000 |
| EP | 0072511 A1 | 2/1983 |
| JP | 08212349 A * | 8/1996 |
| JP | 2002-237062 A | 8/2002 |

* cited by examiner

*Primary Examiner*—Kevin Pyo
(74) *Attorney, Agent, or Firm*—Townsend and Townsend and Crew

(57) ABSTRACT

The invention relates to a method and to an apparatus for the processing of a received signal of an optoelectronic sensor, in particular of a light grid having a plurality of reception channels, with a comparison being carried out between the received signal and a signal delayed with respect to the received signal and the signal obtained by the comparison being supplied to a further processing.

12 Claims, 8 Drawing Sheets

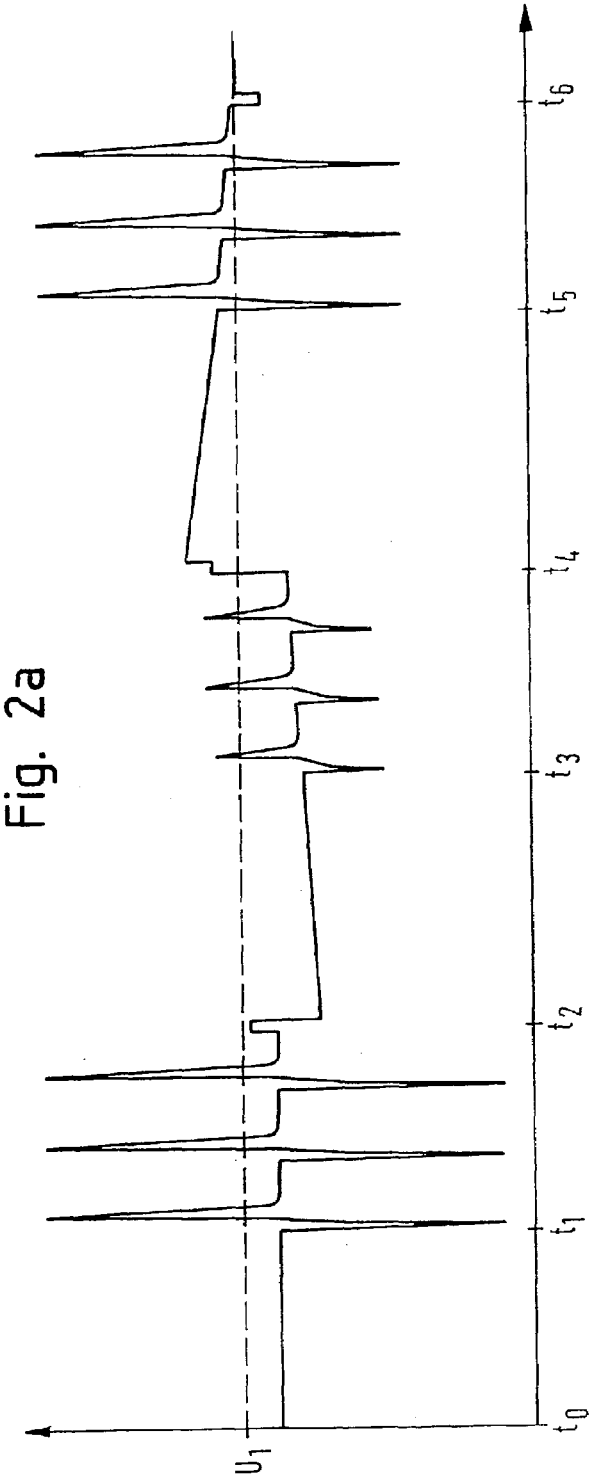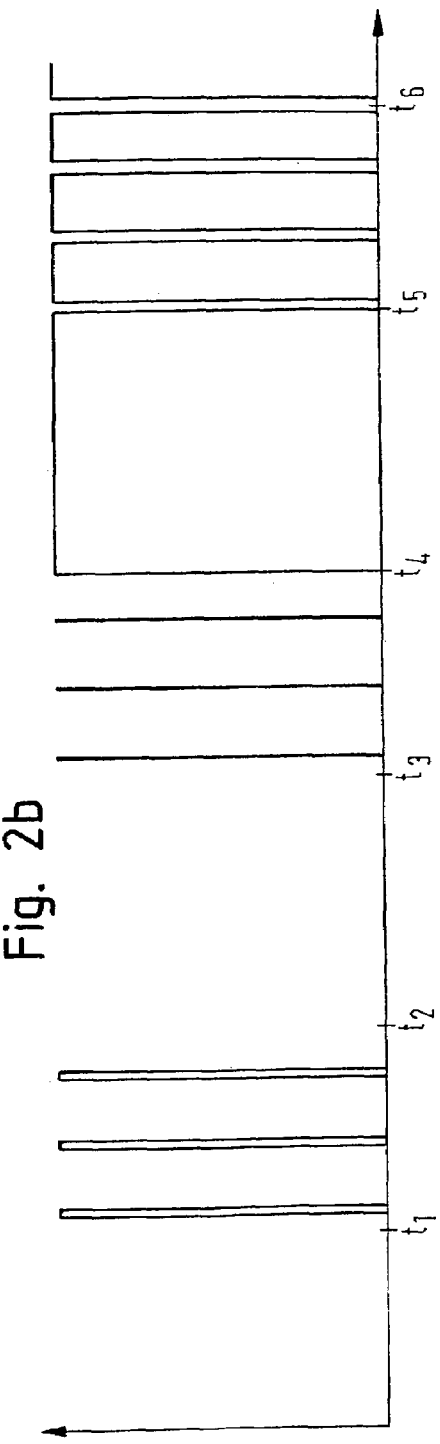

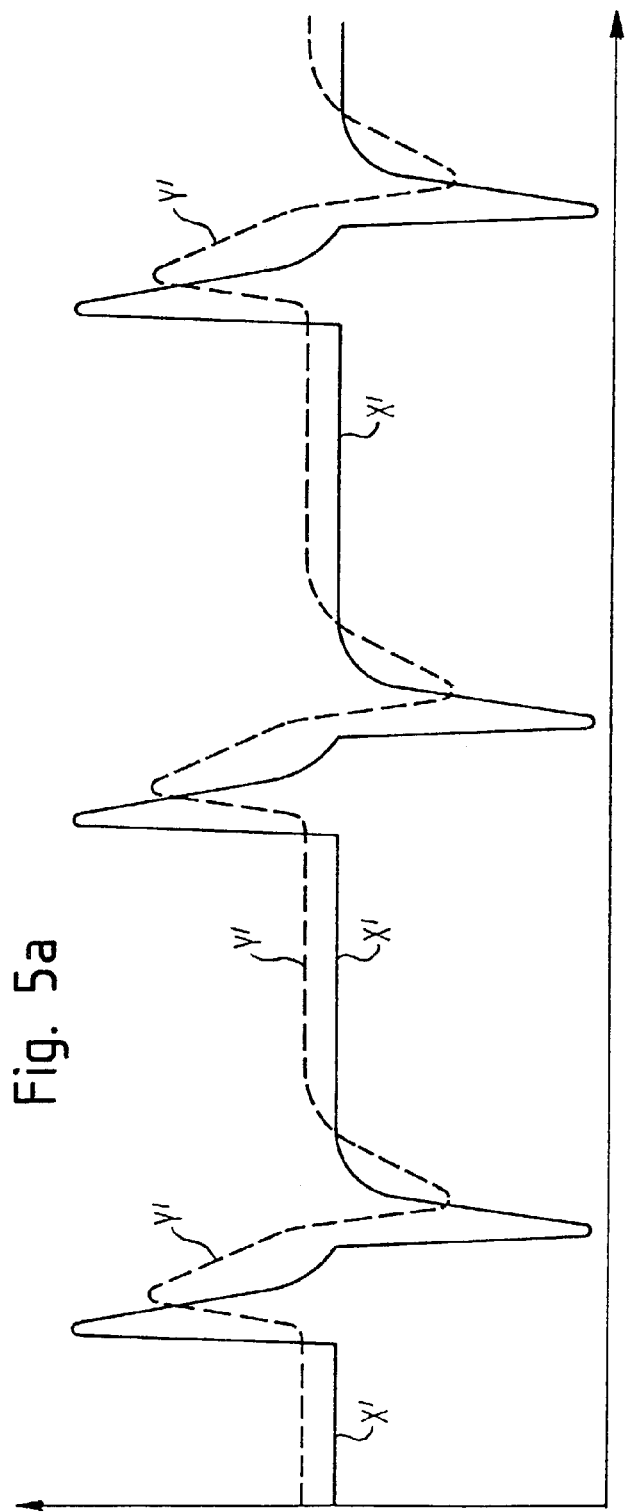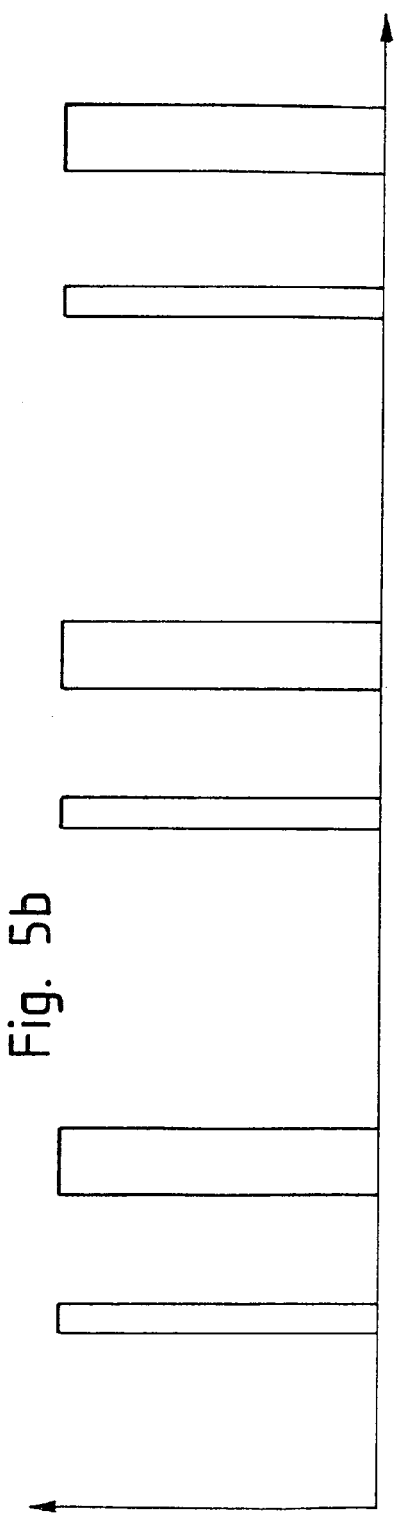

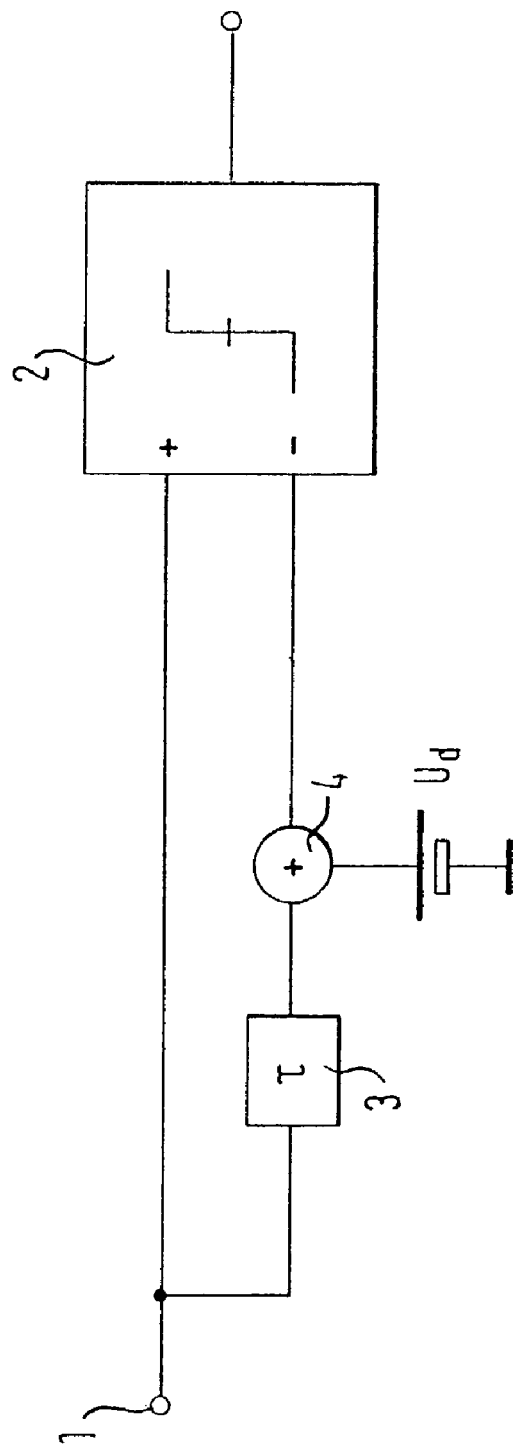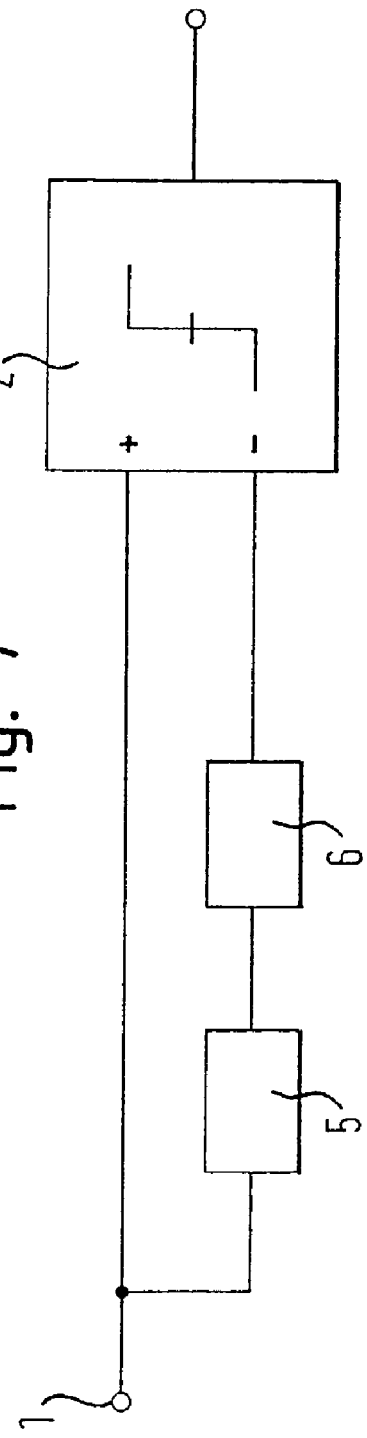

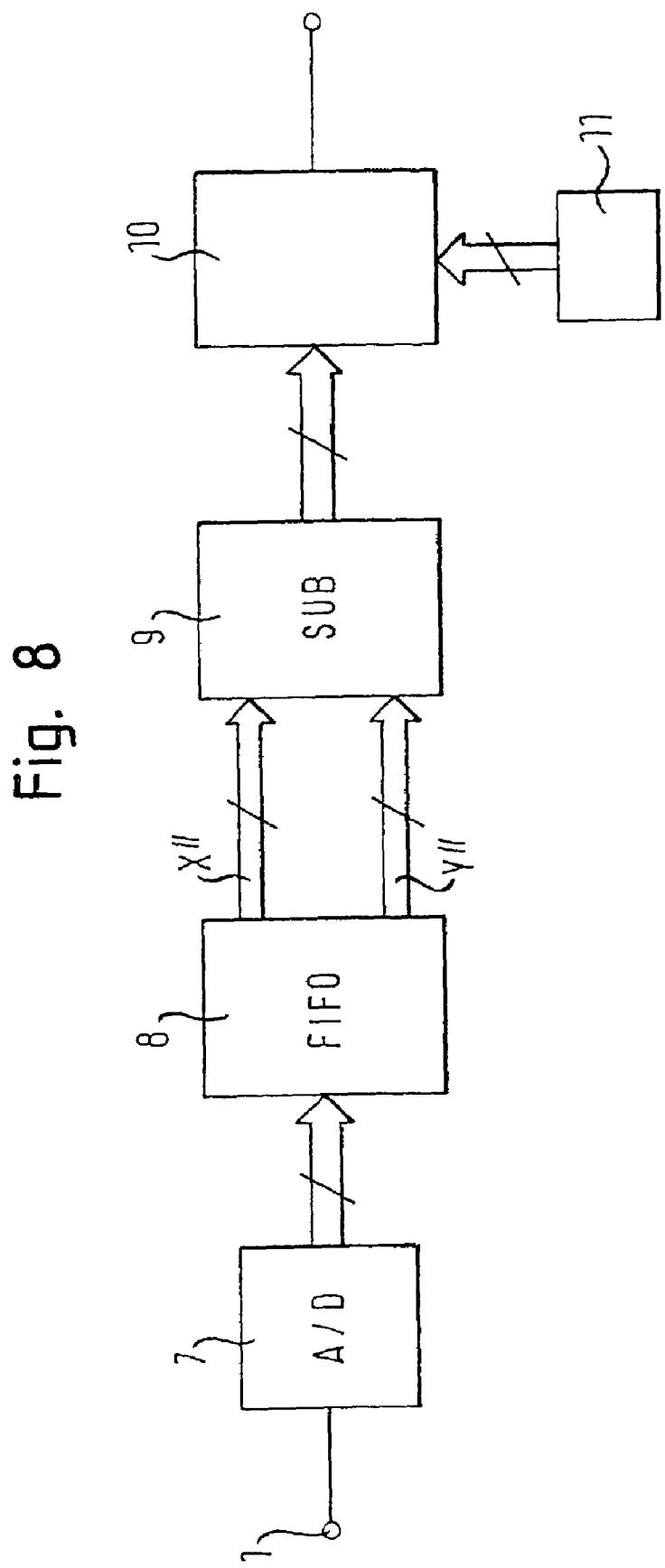

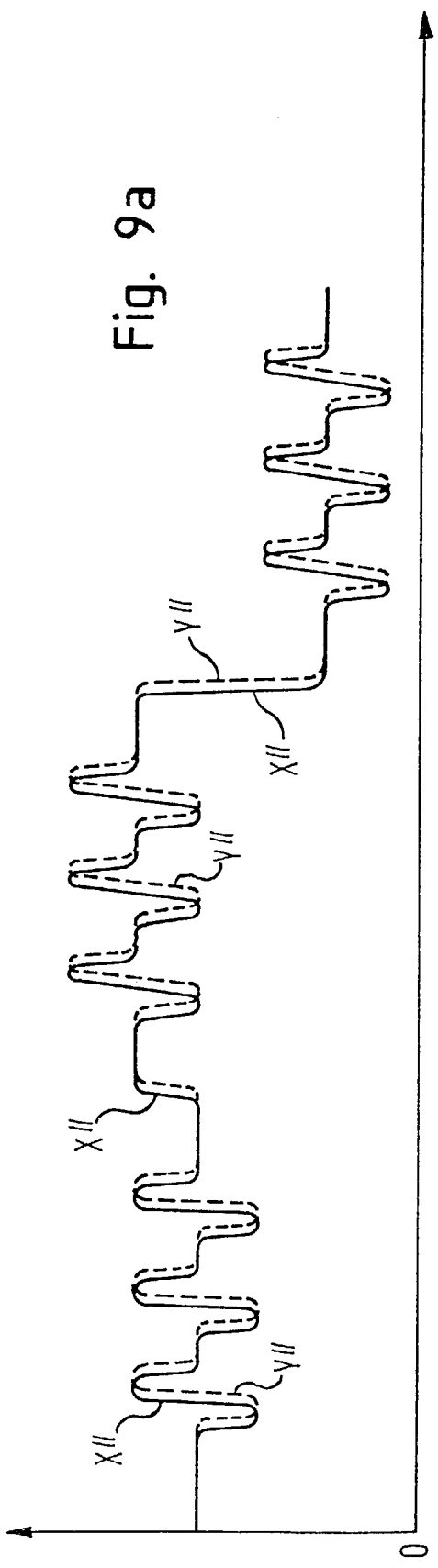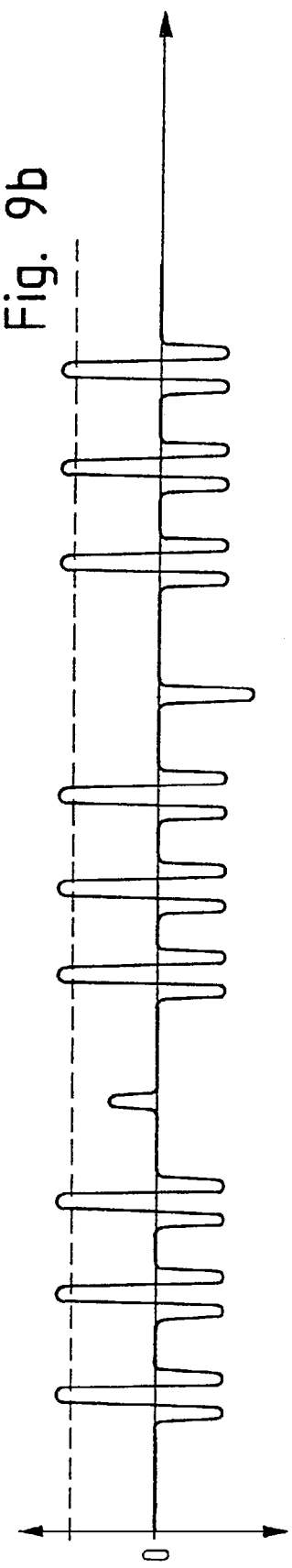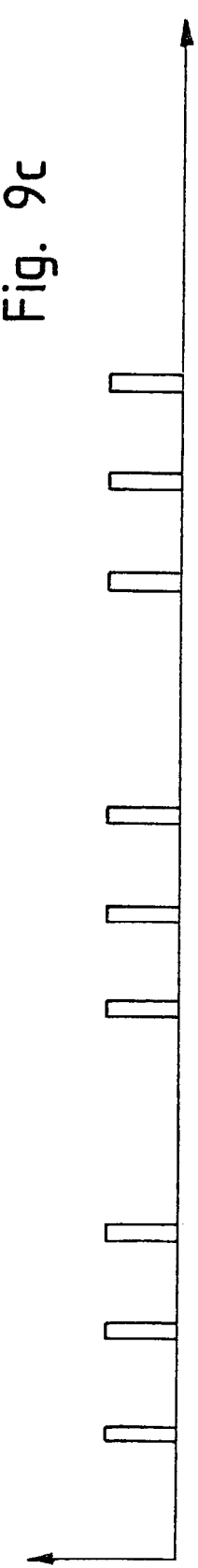

SIGNAL PROCESSING METHOD AND AN EVALUATION CIRCUIT

BACKGROUND OF THE INVENTION

The invention relates to a method for the processing of a received signal of an optoelectronic sensor, in particular of a light grid, as well as an apparatus for the carrying out of such a method.

In automation and security engineering, the use of light grids is known in which a plurality of parallel light beams are periodically transmitted to be able to monitor, for example, a planar surface for the intrusion of an object or of a body part. The received signal associated with each light beam is ultimately compared with a threshold value in a comparator stage in order to trigger an object detection signal or a switch-off signal on the threshold being fallen below or being exceeded. The signal processing chain at the reception side typically contains—for each reception channel—a photodiode as a light receiver, a transimpedance amplifier with a band pass filter property, a difference amplifier stage with a differential current output and the comparator stage. In addition, a control circuit can also be provided for background light suppression.

With respect to the plurality of reception channels, a realization of the evaluation electronics is desired which is as cost-favorable as possible. It is in particular desirable to combine the analog received signal processing for each reception channel at least partly into one integrated circuit, with these circuits being switched in parallel to form an analog bus. For the further reduction of the manufacturing effort, a single, common comparator stage can be provided for all reception channels of this analog bus. All received signals, i.e. all output signals of the respective difference amplifier stages, are then supplied to the comparator stage via the analog bus such that the comparator stage can check for every single reception channel whether a threshold has been exceeded or fallen below.

It is problematic that the integrated circuits associated with the individual reception channels have comparatively large tolerances due to production variance such that production-induced fluctuations which are very high in comparison with one another occur at the output of the respective difference amplifier stages. These fluctuations can result in the comparator determining an exceeding or falling below of the predetermined threshold value with respect to certain reception channels without a light reception having taken place at the associated reception channel. This can result, for example, in no switch-off signal being triggered despite an interruption of a light beam.

This danger could admittedly be eliminated in that a high pass filter is interposed before the comparator. However, it proves to be difficult to find a cut-off frequency for this high pass filter which satisfies the demands of the total system. Too low a cut-off frequency can result in the variation of the respective offset likewise being passed through to the comparator stage on a switching over between the different reception channels and thereby bringing about a switching of the comparator. Too high a cut-off frequency of the high pass filter necessarily lies in the transmission range of the band pass filter of the reception channel or of the integrated circuit. Its band pass filter limits are also necessarily subject to large fluctuations. The interaction with the interposed high pass filter can therefore result in a band pass filter of a higher order with a non-defined transmission function so that the overshoots in the time range resulting from this can again trigger an accidental switching of the comparator stage.

SUMMARY OF THE INVENTION

It is an object of the invention to further improve the detection reliability with a cost-favorable manufacture.

The object is satisfied for a method of the kind initially named in accordance with a first embodiment, preferably a digitally realized embodiment, in that the received signal is supplied to a detection circuit with delays which differ from one another, the detection circuit subtracting the two differently delayed signals from one another and examining the differential signal thus obtained as to whether it exceeds or falls below a predetermined threshold value, with a detection signal being produced which indicates when the difference signal exceeds or falls below the predetermined threshold.

In accordance with the invention, the received signal, which corresponds to the output signal of the respective difference amplifier stage, is therefore not simply compared with a threshold value, but this received signal is rather compared with a signal corresponding to the received signal, but delayed with respect to it. Only the signal resulting from this comparison is then further processed.

Specifically, in the first solution variant in accordance with the invention, the difference is formed between the two differently delayed received signals, or between a non-delayed and a delayed received signal, whereupon the difference signal thus obtained is examined as to when it exceeds or falls below a predetermined threshold value. Since ultimately a difference signal is therefore examined, offset fluctuations at the output of the difference amplifier stage are automatically eliminated, since the respective offset is present in the same manner in the two signals to be subtracted from one another.

It therefore becomes possible by the invention to realize light grid arrangements, for example, with several hundreds of reception channels and correspondingly as many integrated circuits at the receiver side which serve as a common analog bus without the production tolerances which are unavoidable in mass production having a negative effect on the reliability of the light grid.

The first solution variant in accordance with the invention is preferably realized in a digital manner, with the received signal then being supplied to an A/D converter and with the output signal values delivered by the A/D converter being stored in a memory. At least those values should then always be stored at any time in the memory which are delivered by the A/D converter within a predetermined time span before the respectively actual point of time. It is ensured in this manner that those values are also always actually present in the memory which are required for the formation of the delayed received signal. It is accordingly sensible for the time span to correspond at least to the delay difference between the two signals supplied to the detection circuit in accordance with the invention. It is of advantage in practice for the delay difference between the two signals to be compared to one another to correspond approximately to half the individual pulse width of the received signal.

With a corresponding memory utilization, the two signals which are required in accordance with the invention and are to be compared to one another can be produced in that they are both read out of the memory, in particular simultaneously.

The read-out of the memory can then take place for both signals at different memory positions, which each correspond to different points in time of the signal delivered by the A/D converter. The time difference between both points in time then corresponds to the delay difference between the two signals supplied to the detection circuit.

If the two signals to be compared to one another are obtained by a read-out of the memory, the subtraction of these two signals, which are then available in digital form, can likewise be carried out digitally.

The difference signal obtained by the subtraction can be supplied to a digital comparator which compares the difference signal with the predetermined threshold value. This threshold value is preferably non-zero, in order thus to avoid a "jittering" of the output signal of the digital comparator in those time spans in which no light reception is present at the respective reception channel.

The output signal of the digital comparator reliably indicates whether a light reception is present or not at the received signal just examined in each case. Accordingly, the output signal of the digital comparator can be used for the further processing.

In accordance with a second solution variant in accordance with the invention which is preferably realized in an analog manner, the object underlying the invention can be satisfied in that the received signal is supplied to the two inputs of a comparator circuit with delays which differ from one another and with direct components which differ from one another, and the comparator circuit transmits a detection signal which indicates when the one signal applied to the comparator circuit is larger than the other.

The important difference from the first solution variant accordingly lies in the fact that the two signals to be compared to one another are not only delayed differently, but also have a different direct component. Furthermore, there is a difference in that the signal obtained by the comparison no longer has to be compared to a threshold value which is in particular different from zero since, in accordance with the second solution variant, no difference signal is produced, but only an examination is made as to when the one of the two signals to be compared is larger than the other. The points in time at which this condition is satisfied already reliably indicate whether a light reception is present or not at the reception channel respectively just examined.

The difference in the two delays also again preferably amounts to approximately half the individual pulse width of the received signal in the second solution variant.

In the second solution variant, the received signal can be amplified to substantially an equal degree in the two input branches of the comparator circuit. Such an amplification is, however, not necessarily required.

Like the output signal of the digital comparator in the first solution variant, the output signal of the comparator circuit can likewise be used for further processing in the second solution variant.

In both solution variants, the individual pulses of the received signal preferably substantially have the form of a bipolar pulse.

Furthermore, likewise in both solution variants, the output signal of a difference amplifier to which a differential signal produced by the respective optoelectronic sensor is applied is preferably used as the received signal.

The first solution variant of the method in accordance with the invention can, for example, be carried out by means of an evaluation circuit for the processing of a received signal of an optoelectronic sensor, in particular of a light grid, wherein the received signal acts on an A/D converter whose output is applied to a memory, wherein output signals of the memory are applied to the two inputs of a digital subtraction stage, wherein the output signal of the subtraction stage acts on an input of a digital comparator at whose other input a fixed threshold value is applied, and wherein the output signal of the digital comparator acts on a further processing circuit.

The second solution variant of the method in accordance with the invention can, for example, be carried out with an evaluation circuit for the processing of a received signal of an optoelectronic sensor, in particular of a light grid, wherein the received signal is applied in each case via a first and a second signal branch to an input of a comparator, with at least one signal branch having a delay circuit which causes the received signal to be applied to the two inputs of the comparator with delays which differ from one another, and wherein at least one signal branch has an offset circuit which causes the received signal to be applied to the two inputs of the comparator with direct components which are different from one another, the output signal of the comparator acting on a further processing circuit.

The delay circuit and the offset circuit are preferably provided in the same signal branch in this case.

The delay circuit and the offset circuit can be realized by an all pass filter connected in series to a low pass filter, with the all pass filter in particular being formed as an all pass filter of the second order with an integrated inverter. The low pass filter also has an integrated inverter in this case. The low pass filter is preferably disposed after the all pass filter.

The invention will be described in the following with reference to embodiments and to the drawings.

BRIEF DESCRIPTION OF THE DRAWINGS

FIG. 1b shows the shape of an output signal of comparator stage in accordance with the prior art derived from the received signal in accordance with FIG. 1a;

FIG. 2a shows a shape in accordance with FIG. 1 with the difference that the received signal has previously passed through a high pass filter;

FIG. 2b shows the shape of the output signal of a comparator stage in accordance with the prior art derived from a signal in accordance with FIG. 2a;

FIG. 3b shows the output signal of a comparator provided in accordance with the invention based on a signal shape in accordance with FIG. 3a;

FIGS. 5a, b show signal shapes corresponding to FIGS. 4a, b, with the two signals to be compared to one another in accordance with FIG. 5a being inverted in comparison with FIG. 4a;

FIG. 6 is a block diagram of a first embodiment of an analog evaluation circuit for the realization of the second solution variant in accordance with the invention;

FIG. 7 is a block diagram of a second embodiment of an analog evaluation circuit for the realization of the second solution variant in accordance with the invention;

FIG. 8 is a block diagram of a digital evaluation circuit for the realization of the first solution variant in accordance with the invention;

FIG. 9a shows a possible shape of two signals to be compared with one another read out of a memory in accordance with FIG. 8;

FIG. 9b shows the output signal of a subtraction stage in accordance with FIG. 8 resulting with a signal shape in accordance with FIG. 9a; and FIG. 9c shows the output signal of a digital comparator in accordance with FIG. 8 resulting with a shape in accordance with FIG. 9b.

DESCRIPTION OF THE PREFERRED EMBODIMENTS

Figure 1A:
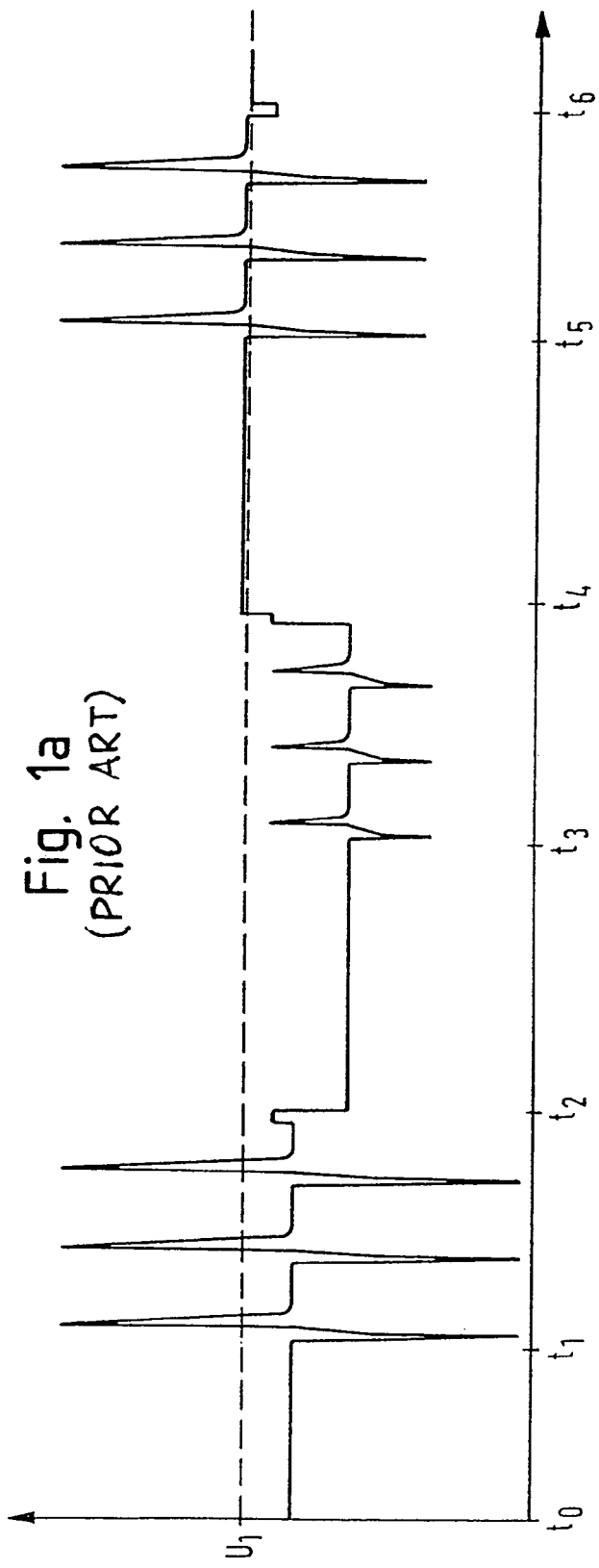
FIG. 1a is an example for a possible shape of a received signal.

FIG. 1a shows the typical shape of a received signal which is applied to a common analog bus and which is associated with a plurality of reception channels different from one another. The signal section in accordance with FIG. 1a shows a region in which signals are delivered from three different reception channels, with each reception channel respectively delivering three individual pulses each substantially having the form of a bipolar pulse. The first reception channel has the time interval from $t_0$ to $t_2$ associated with it, the second reception channel the time interval from $t_2$ to $t_4$ and the third reception channel the time interval from $t_4$ to $t_6$.

Due to the initially mentioned production tolerances of the integrated circuits associated with the individual reception channels, amplitudes of different amounts, and also direct components of different amounts, result for the individual pulses of the different reception channels, which becomes clear on considering FIG. 1a. The direct component in the time interval $t_2$ to $t_4$ is, for example, lower than in the two other time intervals, whereas the amplitudes of the individual pulses are largest in the time interval $t_0$ to $t_2$ and smallest in the time interval $t_2$ to $t_4$.

In accordance with the prior art, an examination is made as to whether the received signal in FIG. 1a exceeds a predetermined threshold value which is characterized by $U_1$ in FIG. 1a.

Figure 1B:
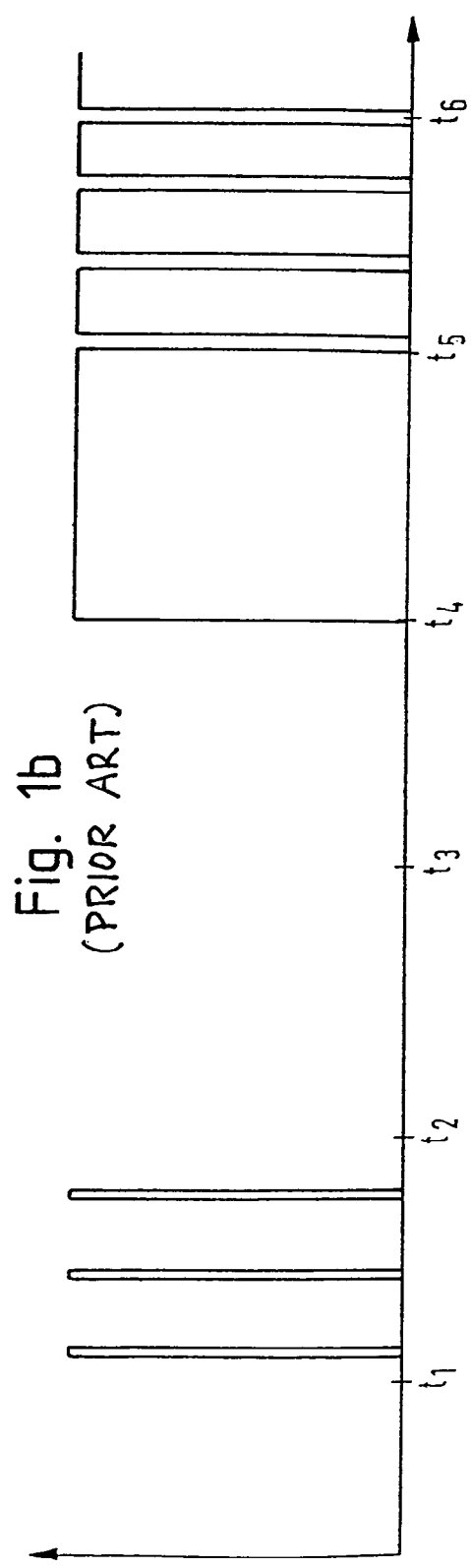

The signal in accordance with FIG. 1b shows a discrete signal which is always "1" when the received signal in FIG. 1a has exceeded the threshold value $U_1$. It can be seen from FIG. 1b that the three individual pulses of the time interval $t_0$ to $t_2$ are correctly detected, whereas the three individual pulses of the time interval $t_2$ to $t_4$, for example, are not detected at all, since the low direct component in this time interval has the effect that the threshold $U_1$ is not exceeded at all. With the time interval $t_4$ to $t_6$, the direct component is then in turn so high that the threshold $U_1$ is exceeded even when an individual pulse is not present, which then results in a corrupt signal "1" in the time interval between $t_4$ and $t_5$.

To avoid the disadvantages of the fluctuating direct component described in connection with FIGS. 1a, b, a received signal which has previously passed through a high pass filter can be examined instead of the signal in accordance with FIG. 1a. Such a received signal is shown in FIG. 2a, with the signal in accordance with FIG. 2a having been produced in that the signal in accordance with FIG. 1a was applied to a high pass filter. The large time constant of the high pass filter required for a distortion-free transfer results in the signal jumping to the new offset value on the switching over from one reception channel to the next reception channel and then decaying with the time constant of the high pass filter.

FIG. 2b in turn shows a discrete signal which is always "1" when the signal in accordance with FIG. 2a exceeds the threshold value $U_1$. It can be seen from the signal shape in accordance with FIG. 2b that an improvement with respect to FIG. 1b can admittedly be realized by the provision of the high pass filter, but that errors still occur.

The three individual pulses in the time interval $t_0$ to $t_2$ are in turn correctly detected in accordance with FIG. 2b. Unlike FIG. 1b, however, the three individual pulses of the time interval $t_2$ to $t_4$ are now also detected correctly since the offset has already decayed by so much in the time interval $t_2$ to $t_3$ that the three individual pulses in the time interval $t_3$ to $t_4$ exceed the threshold value $U_1$.

However, the problem in the time interval $t_4$ to $t_6$ described in connection with FIG. 1b also remains unchanged in accordance with FIG. 2b since the offset again lies above the threshold value $U_1$ at the start of the time interval $t_4$ to $t_6$.

FIGS. 3a to 5b now illustrate which signal shapes can underlie a method in accordance with the invention.

Figure 3A:
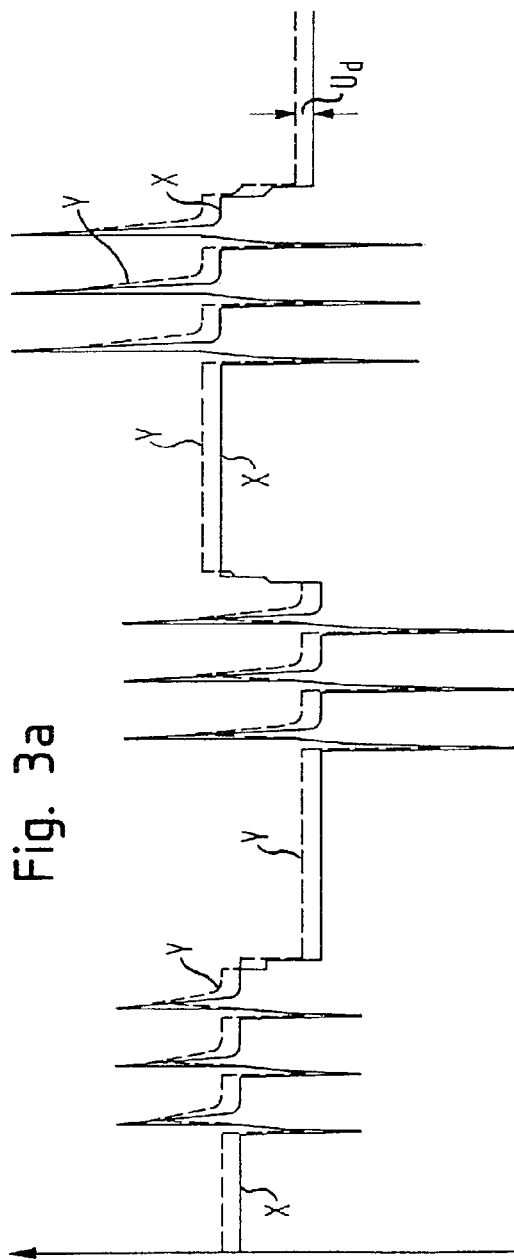
FIG. 3a shows an example for a possible shape of two signals to be compared with one another in accordance with the invention and derived from a received signal.

FIG. 3a shows, in accordance with FIG. 1a with a solid line, the shape of a received signal X applied to an analog bus, with here in turn a time section being shown in which signals are being delivered from three different reception channels. The individual pulses of the different reception channels in turn have amplitudes and direct components which are different from one another.

A signal Y is shown by a broken line which is raised by a direct component $U_d$ with respect to the signal X and which has been time delayed with respect to the signal X. The delay in the example in accordance with FIG. 3a amounts only to a fraction of the length of an individual pulse.

Figure 3B:
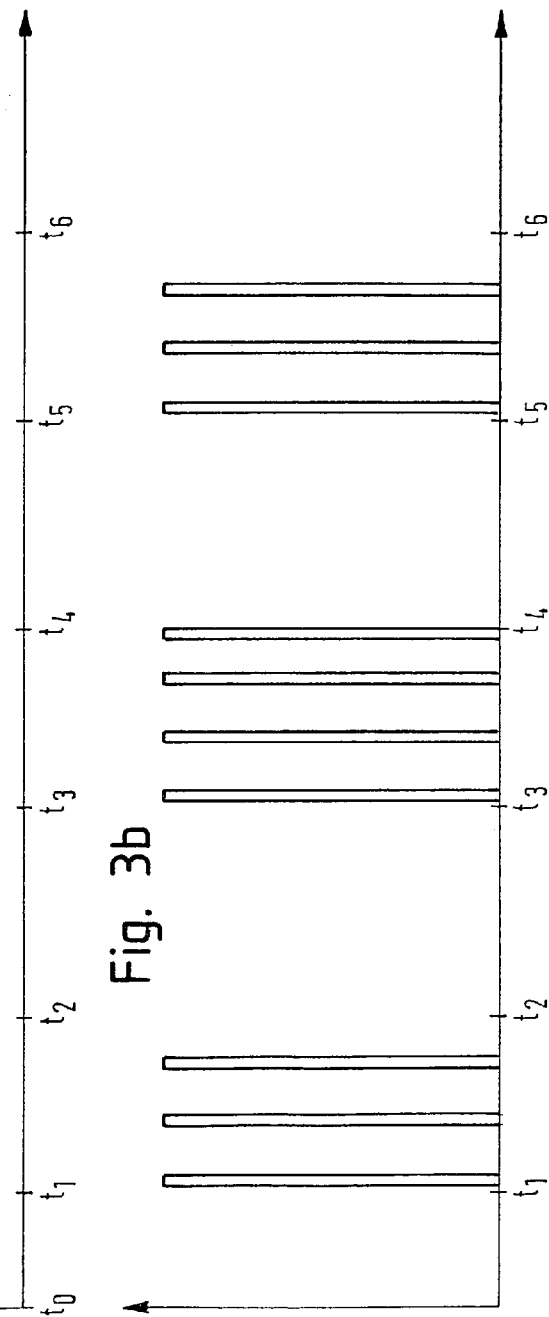

FIG. 3b shows a discrete signal derived from the signals X and Y which always has the value "1" when the signal X is larger than the signal Y. Since this condition always occurs just once with each individual pulse of the signal 3a, and indeed independently of the amplitudes and of the direct components of the individual pulses, the individual pulses of the signal 3a can be reliably recognized by the signal in accordance with FIG. 3b. The fact that the change in the direct component between the interval $t_3$ to $t_4$ and between the interval $t_4$ to $t_5$ likewise results in a signal "1" in accordance with FIG. 3b does not have a disturbing effect since it is known by the synchronization of the total circuit arrangement in which periods of time individual pulses can occur so that signal shapes between these time periods can be excluded from the evaluation.

Figure 4A:
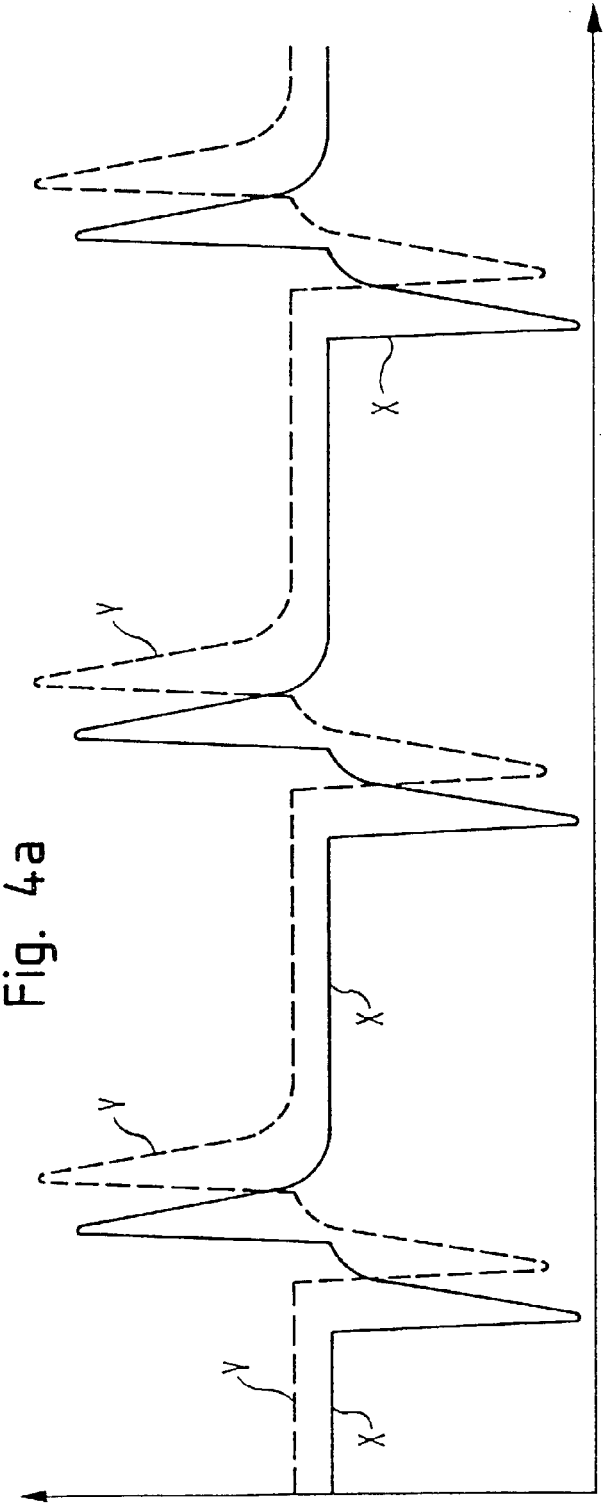
FIGS. 4a, b show signal shapes corresponding to FIGS. 3a and 3b at an enlarged scale, with the delayed signal here not being damped with respect to the non-delayed signal.
Figure 4B:
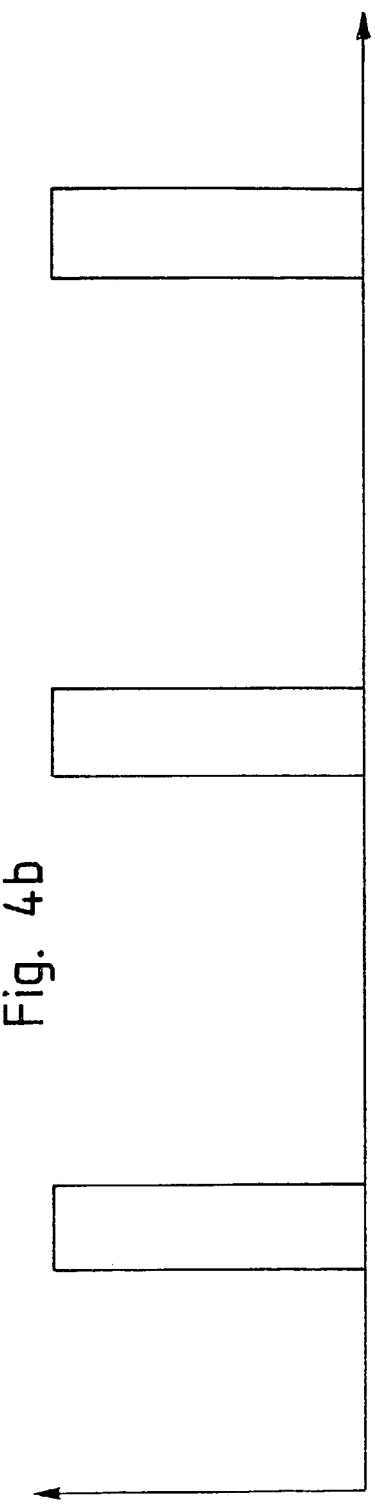

FIGS. 4a and 4b show signal shapes in accordance with FIGS. 3a and 3b with a time resolution enlarged so much that only three individual pulses of a reception channel can be seen. Unlike FIG. 3a, in accordance with FIG. 4a, the signal Y is, however, not damped with respect to the signal X. FIGS. 4a and 4b show in a very illustrative manner that the discrete signal in accordance with FIG. 4b always adopts the value "1" when the signal X is larger than the signal Y. In each individual pulse there is one respective time section in which this condition is satisfied so that, in accordance with FIG. 4b, a total of three pulses are produced. The rising flank of these pulses is time-delayed with respect to the start of each individual pulse of the signal X, since the condition "X>Y" is not present right at the start of an individual pulse.

This time delay can be eliminated in accordance with FIGS. 5a and 5b in that inverted signals X' and Y' are examined. FIG. 5a shows that the condition X'>Y' is present practically directly at the start of an individual pulse X'. This condition is also present at the end of every individual pulse X'; however, the condition is not given in the central region of each individual pulse X'. Accordingly, two pulses per individual pulse result in the discrete signal in accordance with FIG. 5b, which in turn indicates when X' is larger than Y', with the rising flank of the first pulse lying practically simultaneously in time with the rising flank of the individual pulse X'.

Consequently, it can be detected reliably and practically free of delay with the method in accordance with FIGS. 5a, b whether an individual pulse is present or not, and indeed independently of the amplitude and of the direct component of the individual pulse.

FIG. 6 shows a block diagram of an evaluation circuit for the carrying out of a method in accordance with FIGS. 3 and 4.

The received signal X, delivered for example from the output of a difference amplifier stage (not shown), is applied to an input pole 1 of the evaluation circuit. The input pole 1 is connected to a first input of a comparator 2. Furthermore, the input pole 1 is connected to the input of a delay circuit 3. The output of the delay circuit 3 is supplied to a summing stage 4, which superimposes a DC voltage component $U_d$ over the output signal of the delay circuit 3. The output of the summing stage 4 is connected to the second input of the comparator stage 2.

The comparator 2 delivers a discrete output signal which adopts the value "1" when the signal applied to the input pole 1 is larger than the signal coming from the summing stage 4. This output signal corresponds to the discrete signals shown in FIGS. 4b and 5b and is accordingly suitable for further processing.

FIG. 7 shows an alternative embodiment of an evaluation circuit with respect to FIG. 6. The difference with respect to FIG. 6 lies in the fact that the delay circuit 3 and the summing stage 4 have been replaced by a series circuit comprising an all pass filter 5 and a low pass filter 6, with the low pass filter 6 being disposed after the all pass filter 5.

The all pass filter 5 is preferably an all pass filter of the second order into which an inverter has been integrated. An all pass filter of the second order does not supply the delay required in accordance with the invention and additionally has the property of raising the amplitude of higher frequencies with respect to amplitudes of lower frequencies.

The low pass filter 6 in turn has an integrated inverter, damps the higher frequency portions previously amplified by the all pass filter 5 and brings about an additional delay. At the same time, the low pass filter 6 effects an increase in the direct component of the signal supplied to it by the amount $U_d$.

To this extent, the all pass filter 5 and the low pass filter 6 jointly supply the delay required in accordance with the invention as well as the increase in the direct component required in accordance with the invention without complex components such as an all pass filter of the sixth order being required.

The processing of the two signals applied to the comparator 2 takes place in the same manner as already explained with respect to FIG. 6.

FIG. 8 shows a block diagram of a further variant of an evaluation circuit which is suitable for the carrying out of the first solution variant in accordance with the invention on a digital basis.

The output signal of a difference amplifier stage (not shown) is, for example, in turn applied to the input pole 1 of the evaluation circuit. This signal corresponds to the "received signal" in the terminology of this application.

The received signal is supplied to an A/D converter 7 which makes available the digital values generated in dependence on the received signal to a memory 8. The memory 8 is formed as a ring memory or a FIFO memory such that the latest values delivered from the A/D converter 7 can respectively be stored in it.

The memory 8 is read out simultaneously at two different memory positions, with the two values originating from these two memory positions each being supplied to an input of a digital subtraction stage 9 in which the two values are subtracted from one another.

The output of the subtraction stage 9 acts on a first input of a digital comparator 10 whose second input is assigned a fixed threshold value which is made available by a correspondingly formed component 11.

The digital comparator 10 always delivers an output signal of the value "1" when the value coming from the digital subtraction stage 9 is larger than the threshold value delivered by the component 11. Accordingly, the output signal of the digital comparator 10 is suitable for further processing.

FIGS. 9a to c illustrate possible signal shapes such as can occur in an evaluation circuit in accordance with FIG. 8.

The time development of values is shown by a solid line in FIG. 9a which originates from a first memory position of the memory 8. This signal is designated by X" in FIG. 9a. Accordingly, the time development of the values which are read out from a second memory position of the memory 8 is illustrated by a broken line. This signal is designated by Y".

It can be seen from FIG. 9a that the signal Y" is delayed with respect to the signal X", which means that the values of the signal X" are read from a more current memory position than the values of the signal Y".

The shape of both signals X" and Y" shows, in accordance with FIG. 1a, three times three individual pulses which originate from three different reception channels of a light grid. In the example in accordance with FIG. 9a, the amplitude of the individual pulses is equally high in each case, but the direct components fluctuate in dependence on the reception channel. The method explained in connection with FIGS. 8 and 9, however, likewise works when individual pulses which differ from one another in their amplitude are delivered by the difference reception channels.

In the digital subtraction stage 9 in accordance with FIG. 8, the difference is formed between the signals X" and Y" and the difference signal resulting from this is shown in FIG. 9b. Accordingly, a shape comprising 1.5 periods and of a substantially sinusoidal shape results for each individual pulse, with the maximum positive amplitude of this shape being larger than its maximum negative amplitude.

An examination is now made by means of the digital comparator 10 (FIG. 8) as to when the signal in accordance with FIG. 9b exceeds a threshold value $U_s$. In those time spans in which the condition applies, the digital comparator 10 generates an output signal of the value "1"; in the remaining time periods the output signal of the digital comparator 10 has the value "0".

The output signal of the digital comparator 10 is illustrated in FIG. 9c. It can be seen from this signal that precisely one pulse is delivered per individual pulse in accordance with FIG. 9a, which shows that the method described is suitable for the reliable detection of individual pulses, and indeed independently of their amplitude and their direct component.

The invention claimed is:

1. A method for the processing of a received signal of an optoelectronic sensor characterized in that pulsed radiation is applied to the optoelectronic sensor and pulsed received signals are emitted by the optoelectronic sensor, in that a pulsed received signal is conditioned to generate first and second pulsed received signals from the received signal, the second received signal being delayed relative to the first received signal, in that the first and second received signals are supplied to a detection circuit, in that the detection circuit subtracts the first and second received signals from one another and thereupon examines a difference signal obtained in this manner as to whether it exceeds or falls below a predetermined threshold value, in that a detection signal is produced which indicates when the difference signal exceeds or falls below the predetermined threshold value, and in that the pulsed received signal is supplied to an A/D converter and output signal values delivered by the A/D converter are stored in a memory.

2. A method in accordance with claim 1, characterized in that at least those values which were delivered by the A/D converter within a predetermined time span before the respectively actual point in time are always stored in the memory.

3. A method in accordance with claim 2, characterized in that the time span at least corresponds to the delay difference between the first and second received signals supplied to the detection circuit.

4. A method in accordance with claim 2, characterized in that the delay difference corresponds approximately to half the individual pulse width of the received signal.

5. A method in accordance with claim 1, characterized in that the two differently delayed signals supplied to the detection circuit are produced by a read-out of the memory.

6. A method in accordance with claim 5, characterized in that the reading out of the memory takes place for the first and second received signals at different memory positions which correspond to different points in time of the output signal values delivered by the A/D converter.

7. A method in accordance with claim 6, characterized in that the time difference between the different points in time corresponds to the delay difference between the first and second received signals supplied to the detection circuit.

8. A method in accordance with claim 5, characterized in that the subtraction of the first and second received signals is carried out digitally.

9. A method in accordance with claim 1, characterized in that the difference signal obtained by the subtraction is supplied to a digital comparator which compares the difference signal with the threshold value.

10. A method in accordance with claim 9, characterized in that the threshold value is non-zero.

11. A method in accordance with claim 9, characterized in that the output signal of the digital comparator is used for the further processing.

12. A method for the processing of a received signal of an optoelectronic sensor characterized in that pulsed radiation is applied to the optoelectronic sensor and pulsed received signals are emitted by the optoelectronic sensor, in that a pulsed received signal is conditioned to generate first and second pulsed received signals from the received signal, the second received signal being delayed relative to the first received signal, a delay difference between the first and second signals being approximately half the individual pulse width of the received signal, in that the first and second received signals are supplied to a detection circuit, in that the detection circuit subtracts the first and second received signals from one another and thereupon examines a difference signal obtained in this manner as to whether it exceeds or falls below a predetermined threshold value, and in that a detection signal is produced which indicates when the difference signal exceeds or falls below the predetermined threshold value.

* * * * *